Sept. 21, 1948.　　　　N. P. PEET　　　　2,449,617
CATALYTIC CRACKING PROCESS
Filed June 5, 1945
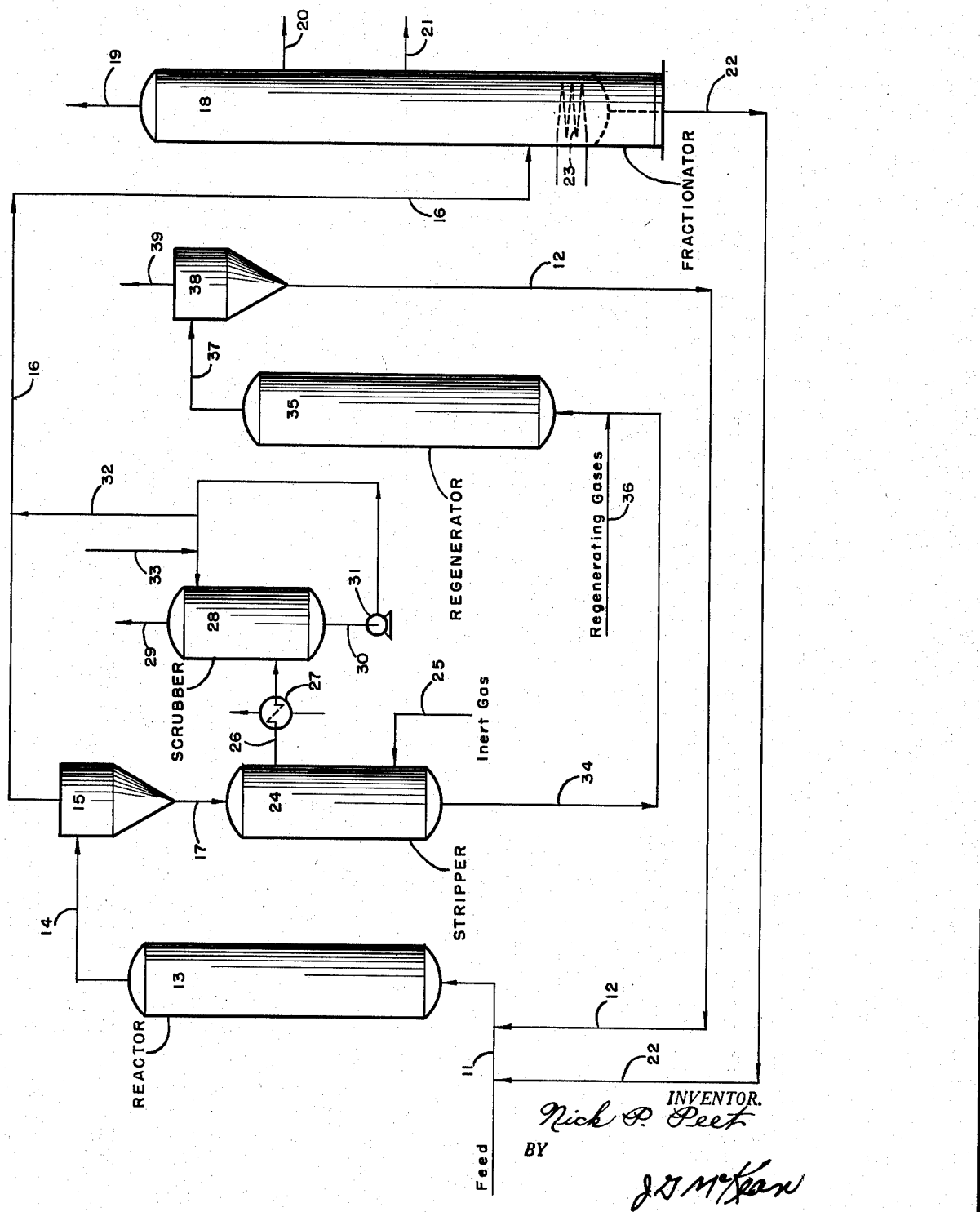
INVENTOR.
Nick P. Peet
BY
J. D. McKean
ATTORNEY.

Patented Sept. 21, 1948

2,449,617

UNITED STATES PATENT OFFICE 2,449,617

CATALYTIC CRACKING PROCESS

Nick P. Peet, Goose Creek, Tex., assignor to Standard Oil Development Company, a corporation of Delaware Application June 5, 1945, Serial No. 597,662

6 Claims. (Cl. 196—52)

The present invention is directed to improvements in the art of converting relatively heavy liquid hydrocarbons into lower boiling hydrocarbons in the presence of a powdered solid catalyst.

More particularly, the present invention is directed to a process involving the steps of contacting powdered solid catalyst with hydrocarbon feed stock in a reaction zone to crack a substantial portion of the feed stock, separating powdered catalyst from product produced by the reaction, regenerating the catalyst and recycling it to the reaction zone and recovering hydrocarbon product formed in the reaction zone wherein a high activity of the catalyst is maintained and the hydrocarbon product is recovered in a simple effective manner.

In the catalytic process of the present invention, the mixture of powdered solid catalyst and hydrocarbon vapors withdrawn from the reaction zone is subjected to a separation step performed under the influence of gravity to obtain a hydrocarbon fraction and a catalyst fraction and these fractions are separately removed from the settling step. The catalyst fraction is then stripped in a stripping zone at a relatively high temperature by bringing it in contact with an inert stripping gas and the stripped catalyst and the stripping gas enriched with hydrocarbon vapors are separately removed from the stripping zone. The stripped catalyst is sent to a regeneration zone where its catalyst activity is restored and the regenerated catalyst is then returned to the reaction zone. The inert stripping gas enriched with hydrocarbon vapors is sent from the stripping zone to a scrubbing zone where the mixture is brought into intimate contact with a scrubbing oil to dissolve at least a major portion of the hydrocarbon vapors in the scrubbing oil. Scrubbed inert gases are discarded from the scrubbing zone while the enriched scrubbing oil is subjected to a step to recover the low molecular weight hydrocarbons therefrom. It is preferred to subject the enriched scrubbing oil and the hydrocarbon fraction removed from the solid catalyst in the separation step to a fractional distillation operation to obtain a plurality of fractions of different boiling points as well as recovered lean solvent which may be recycled to the scrubbing zone.

The practice of the present invention will now be described in greater detail in conjunction with the drawing, in which the sole figure is in the form of a diagrammatic flow sheet. A vaporized hydrocarbon feed stock is passed through inlet line 11 where it is admixed with finely divided solid catalyst by means of line 12. The mixture of vaporized hydrocarbons and powdered catalyst enters into the lower end of a reactor 13. The reactor is maintained at a temperature suitable for producing a substantial cracking of the feed stock and the mixture of hydrocarbon product in vaporous form and finely divided solid catalyst is withdrawn through outlet 14 and passed into a cyclone separator 15 where the mixture is separated into a vaporized hydrocarbon fraction which is removed from the separator to outlet 16 and a catalyst fraction including residual hydrocarbons which is removed from separator 15 through outlet 17. The vaporized product is passed through line 16 into a fractionator 18 where it is fractionally distilled to separate it into a plurality of fractions. In the drawing, fractionator 18 is shown as provided with outlet 19 for removing an overhead fraction, outlets 20 and 21 for removing side stream fractions and an outlet 22 for removing a bottoms.

Cyclone separator unit 15 does not remove all of the solid finely divided catalyst from the hydrocarbon vapors and a minor portion of the solid catalyst is carried along with the hydrocarbon vapors as they pass through line 16 to fractionator 18. These finely divided solids accumulate in the lower portion of distillation column 18 and are removed with the bottoms fraction through line 22. The slurry comprising the solid divided catalytic material and bottoms is recycled from fractionator 18 through line 22 to the vaporous feed being introduced through line 11 into reactor vessel 13.

If a gas oil is employed as the hydrocarbon charging stock entering the system through line 11, the converted oil fractionated in column 18 may be divided into an overhead boiling below 400° F., a light side stream, a heavier side stream and a bottoms having an initial boiling point from about 500° F. It will be understood that column 18 is a conventional fractionating column and may be provided with a heating coil 23 to furnish heat to the liquids passed into the column in order to maintain a suitable degree of vaporization within the column. When treating a fraction having the characteristics above described, the fractionator may operate at a bottom temperature in the range of 500° to 650° F. and at a pressure between 7 and 15 pounds per square inch.

The catalyst fraction withdrawn from cyclone separator 15 through outlet 17 is discharged into stripper 24. The hydrocarbon vapors entrained in the solid finely divided catalyst are removed therefrom in stripper 24 by the use of a gaseous stripping medium discharged into the tower through inlet 25. It is preferable to employ a gas incapable of reacting with the hydrocarbon vapors or with the catalyst under the temperature conditions in stripper 24 and examples of such gases include flue gas, hydrogen, and carbon dioxide. In order to obtain a substantially complete removal of hydrocarbon vapors from the solid finely divided catalyst in vessel 24, it is preferred to maintain the interior of this vessel at a temperature within the range of 800 to 1000° F. and preferably in the range of 900 to 1000° F. The mixture of inert gas and hydrocarbon vapors stripped from the the catalyst is removed from the upper portion of stripping tower 24 through outlet 26 and is passed through cooler 27 and into the lower portion of scrubbing vessel 28. In vessel 28 the gaseous mixture passes upwardly and is brought into intimate contact with a suitable scrubbing material, such as a heavy oil, which is discharged into the upper end of the vessel and falls downwardly therein. The contact of the scrubbing liquid with the gaseous mixture causes the removal of substantially all of the hydrocarbon vapors therefrom and the scrubbed inert gases are removed from the upper end of vessel 28 through outlet 29. The scrubbing liquid accumulates in the lower end of vessel 28 and is withdrawn through line 30 containing pump 31 and is recycled by line 30 back to the upper end of the tower. In order to maintain the scrubbing liquid sufficiently lean to absorb the hydrocarbon vapors introduced into vessel 28 a portion of the circulating liquid is removed from line 30 through line 32 and is commingled with the hydrocarbon stream in line 16, the commingled stream being passed into fractionator 18 where it is fractionally distilled. The volume of scrubbing liquid being circulated in vessel 28 is maintained constant by the addition of fresh lean solvent via inlet 33 in an amount sufficient to replace that withdrawn through line 32.

The finely divided solid catalyst from which the hydrocarbon vapors have been stripped is withdrawn from the lower portion of stripper 24 through outlet 34 and discharged into regenerator 35. Gases for carrying out the regeneration step, for example a mixture of air and steam, may conveniently be introduced into the stream of catalyst through inlet 36. The temperature within the regenerator zone 35 should not be allowed to exceed a maximum of 12000° F. with a preferred range from 1050 to 1150° F. A mixture of regenerated catalyst and spent gases is withdrawn from the upper end of vessel 35 through outlet 37 and is discharged to a second cyclone separator 38 where it is separated into a gaseous fraction removed through outlet 39 and a regenerated catalyst fraction which is removed through line 12 and recycled to the fresh feed stock being passed to the reactor 13 through inlet 12.

In order to illustrate the advantages of using an inert gas as the medium for stripping catalyst, the following example is given:

In an operation similar to that described in conjunction with the drawing, a comparison was made between stripping the spent catalyst with steam and with an inert gas such as flue gas. In other instances a 1% catalyst replacement rate was employed. The following results were obtained:

|  | Steam | Inert Gas |
| --- | --- | --- |
| $D+L$ at 400° F | 33 | 44 |
| Conversion percent (gas oil disappearance) | 50 | 63.5 |

These data indicate a considerable advantage for employing inert gas as a stripping medium. The distillate plus loss ($D+L$) at 400° F., which is a measure of catalyst activity, shows an increase of eleven points from 33 to 44. The conversion shows an increase to 63.5 from 50 for the inert gas stripping. To obtain the same increase in conversion when using steam as a stripping agent would require a seven-fold increase in catalyst circulation which, as may be easily seen, would necessitate considerable capital expenditure.

The method of expressing catalyst activity ($D+L$ at 400° F.) indicates the amount distilled plus loss at 400° F. of the fraction obtained after passing a standard feed stock across the catalyst being tested under standard conditions of temperature and pressure. This method of expressing catalyst activity has been adopted in the cracking industry.

In addition to the improvement in catalyst activity and conversion, there are other improvements attributable to the inert gas employed as a stripping agent in accordance with the present invention. Catalytic cracking has become a widely accepted tool in producing aviation fuel. In accordance with the present invention, the quality and quantity of aviation gasoline producible in a catalytic cracking operation employing inert gas as a stripping medium is markedly increased over the quality and amount producible in conventional catalytic cracking operations employing steam for stripping the catalyst.

It will be understood that the conditions within the stripping zone 24 may be varied over a substantial range. It is preferred, however, to maintain the temperature within the range of 900 to 950° F. Conventionally the solid finely divided catalyst is either a natural or artificial clay with a particle diameter ranging from 20 to 80 microns. The volume of stripping gases employed in stripper 24 may be varied within the range of .1 to .5 pound moles of stripping gases per 1000 pounds of catalyst; under normal operating conditions, approximately .5 pound moles of inert stripping gas per 1000 pounds of catalyst will be found satisfactory.

It will be understood that the description of the process in conjunction with the drawing and the preferred ranges given are by way of illustration and not by way of limitation. It will also be understood that the showing in the drawing is illustrative only. For example, instead of a single cyclone separator for separating solids from gasiform constituents, as indicated by units 15 and 38, in commercial practice it may be found desirable to employ a series of separating units for each unit 15 and 38. Similarly, instead of a single fractionating tower 18 in plant practice a series of towers will usually be found desirable. Auxiliary equipment, such as valves and screw conveying means for removing the powdered catalyst, may conventionally be employed in the operation, but a showing of such auxiliary equipment has been omitted from the drawing for purposes of simplification.

Having fully described and illustrated the practice of the present invention, what I desire to claim is:

1. A catalytic cracking process including the steps of contacting a vaporized hydrocarbon feed stock with a powdered solid catalyst in a reaction zone to cause a substantial cracking of the hydrocarbon feed stock, removing a mixture of hydrocarbon vapors and powdered catalyst from the reaction zone and separating it into a light fraction comprising at least a major portion of hydrocarbon vapors and a heavy fraction comprising a substantial portion of powdered catalyst, bringing the heavy fraction into contact with a heated inert gas in a stripping zone to strip residual hydrocarbons therefrom said stripping gas being nonreactive with said residual hydrocarbons and with the catalyst under conditions in the stripping zone, removing a gaseous fraction from the stripping zone, removing spent catalyst from the stripping zone and passing it to a regeneration zone, regenerating said spent catalyst in the regeneration zone and admixing said regenerated catalyst with hydrocarbon feed stock being passed to the reaction zone, passing the gaseous fraction removed from the stripping zone to a scrubbing zone and there intimately contacting it with a lean oil to obtain a fixed gas fraction and a scrubbing oil fraction, separately removing the fixed gas fraction and the scrubbing oil fraction from the scrubbing zone, admixing at least a portion of said scrubbing oil fraction with said light fraction removed from the first separating zone and fractionally distilling the mixture in a distillation zone to separate it into a plurality of liquid hydrocarbon fractions.

2. A catalytic cracking process including the steps of contacting a vaporized hydrocarbon feed stock with powdered solid catalyst in a reaction zone to cause cracking of a substantial portion of the feed stock, removing a mixture of hydrocarbon and powdered catalyst from the reaction zone and separating it in a first separating zone to form a hydrocarbon fraction and a catalyst fraction, bringing said catalyst fraction into contact with an inert stripping gas in a stripping zone to remove residual hydrocarbons therefrom said stripping gas being nonreactive with said residual hydrocarbons and with the catalyst under conditions in the stripping zone, withdrawing stripped powdered catalyst from the stripping zone, withdrawing a mixture of hydrocarbons and inert gas from the stripping zone, passing the stripped powdered catalyst from the stripping zone to a regeneration zone and there contacting the catalyst with an oxidizing gas to cause regeneration thereof, removing a mixture of gas and regenerated catalyst from the regeneration zone and separating it in a second separating zone into a gaseous fraction and a regenerated catalyst fraction, admixing the regenerated catalyst with hydrocarbon feed stock being passed into the reaction zone, contacting the mixture of hydrocarbons and inert gases withdrawn from the stripping zone with a lean oil in a scrubbing zone to obtain a scrubbed gas and a scrubbing oil, separately removing the scrubbed gas and the scrubbing oil from the scrubbing zone, and fractionally distilling the hydrocarbon fraction removed from the first separating zone in admixture with at least a portion of the scrubbing oil removed from the stripping zone to recover fractions of normally liquid hydrocarbons therefrom.

3. A method in accordance with claim 2 in which the reaction zone is maintained at a temperature within the range of 900 to 1000° F. and in which the regeneration zone is maintained at a temperature within the range of 800 to 1200° F.

4. A method in accordance with claim 2 in which the stripping zone is maintained at a temperature within the range of 900 to 1000° F.

5. A method in accordance with claim 2 in which the reaction zone is maintained at a temperature within the range of 900 to 1000° F., the stripping zone at a temperature within the range of 900 to 1000° F. and the regeneration zone at a temperature within the range of 900 to 1200° F.

6. A method in accordance with claim 2 in which the inert stripping gas, which is nonreactive with the residual hydrocarbons and with the catalyst, is flue gas.

NICK P. PEET.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,259,486 | Carpenter | Oct. 21, 1941 |
| 2,259,487 | Payne | Oct. 21, 1941 |
| 2,303,680 | Brueckmann | Dec. 1, 1942 |
| 2,328,325 | Butikofer | Aug. 31, 1943 |
| 2,356,680 | Maranick | Aug. 22, 1944 |
| 2,370,816 | Schonberg | Mar. 6, 1945 |